(12) United States Patent
Robinson

(10) Patent No.: US 7,280,038 B2
(45) Date of Patent: Oct. 9, 2007

(54) EMERGENCY RESPONSE DATA TRANSMISSION SYSTEM

(76) Inventor: John Robinson, 8854 Jimeno Rd., Santa Barbara, CA (US) 93103

( * ) Notice: Subject to any disclaimer, the term of this patent is extended or adjusted under 35 U.S.C. 154(b) by 526 days.

(21) Appl. No.: 10/820,471

(22) Filed: Apr. 7, 2004

(65) Prior Publication Data
US 2006/0059139 A1 Mar. 16, 2006

Related U.S. Application Data

(60) Provisional application No. 60/461,684, filed on Apr. 9, 2003.

(51) Int. Cl.
G08B 29/00 (2006.01)

(52) U.S. Cl. .............. 340/506; 707/104.1; 702/19; 702/22; 702/3; 340/539.17

(58) Field of Classification Search ........... 340/632, 340/531, 506; 702/2, 22; 703/11, 12; 707/104.1
See application file for complete search history.

(56) References Cited

U.S. PATENT DOCUMENTS

| | | | |
|---|---|---|---|
| 5,815,417 A * | 9/1998 | Orr et al. ............ | 703/5 |
| 6,574,561 B2 * | 6/2003 | Alexander et al. ..... | 702/5 |
| 6,748,400 B2 * | 6/2004 | Quick .............. | 707/104.1 |
| 2001/0056435 A1 * | 12/2001 | Quick .............. | 707/104.1 |
| 2002/0069312 A1 * | 6/2002 | Jones ............... | 711/100 |

OTHER PUBLICATIONS

Author Unknown, FEMA Battelle Presentation entitled "Disaster Management", Nov. 20, 2002.

* cited by examiner

Primary Examiner—Jeffery Hofsass
Assistant Examiner—Hoi C. Lau
(74) Attorney, Agent, or Firm—Felix L. Fischer

(57) ABSTRACT

A system and method using low-bandwidth to deliver key data from preexisting emergency response data programs to remote computer facilities using a variety of communications capabilities is provided. Key displays are re-created with enhanced information content and for distribution to a broad user audience via the Internet. Displays are updated every few seconds to remain synchronized with the on-site emergency response data program computer's current status.

3 Claims, 5 Drawing Sheets

EMERGENCY RESPONSE DATA TRANSMISSION SYSTEM

REFERENCE TO RELATED APPLICATIONS

This application claims priority of U.S. provisional application Ser. No. 60/461,684 filed on Apr. 9, 2003 having the same title as the present application.

REFERENCE TO COMPUTER PROGRAM CD

This application includes as an appendix a CD providing a source code and installation package for a computer program incorporating an exemplary embodiment of the present invention as disclosed herein. The materials contained on the CD are incorporated by reference as though fully set forth herein.

BACKGROUND OF THE INVENTION

1. Field of the Invention

This invention relates generally to the field of emergency data management systems and, more particularly, to a web enabled comprehensive data management agent for distribution of preexisting or evolving hazardous chemicals location, chemical data and responding units information.

2. Description of the Related Art

Use of computer databases for emergency response systems has expanded to include highly sophisticated and capable systems. One exemplary system, CAMEO® Computer-Aided Management of Emergency Operations, is a set of computer programs developed by the National Oceanic and Atmospheric Administration and the US Environmental Protection Agency to assist emergency planners and responders in dealing with incidents involving hazardous chemicals. CAMEO® is a registered trademark of the National Oceanic and Atmospheric Administration.

As defined by the EPA on the CAMEO® website "CAMEO® is a system of software applications used widely to plan for and respond to chemical emergencies. It is one of the tools developed by EPA's Chemical Emergency Preparedness and Prevention Office (CEPPO) and the National Oceanic and Atmospheric Administration Office of Response and Restoration (NOAA), to assist front-line chemical emergency planners and responders. They can use CAMEO® to access, store, and evaluate information critical for developing emergency plans. In addition, CAMEO® supports regulatory compliance by helping users meet the chemical inventory reporting requirements of the Emergency Planning and Community Right-to-Know Act (EPCRA, also known as SARA Title III). The CAMEO® system integrates a chemical database and a method to manage the data, an air dispersion model, and a mapping capability. All modules work interactively to share and display critical information in a timely fashion. The CAMEO® system is available in Macintosh and Windows formats."

As mentioned above, the CAMEO® system contains three modules that are further defined in FIG. 1 of the drawings. The CAMEO® Databases module 10 provides the stored information and properties for Chemical Facility Database; Local Chemical Inventories; Emergency Planning Data; Contacts; Past Incidents Database and Special Locations Database. The ALOHA® (Areal Locations of Hazardous Atmospheres) module 12 provides basic atmospheric dispersion modeling for a number of volatile substances in the chemical database. The MARPLOT® (Mapping Application for Response Planning and Local Operational Tasks) module 14 provides a mapping facility based on Census Bureau street maps. ALOHA® and MARPLOT® are registered trademarks of the National Oceanic and Atmospheric Administration.

Approximately 40,000 copies of the CAMEO® system have been downloaded from EPA since May, 2002. The programs are available at no cost to the user. A significant number of these systems are used by the nation's firefighters in responding to chemical accidents. According to NOAA, the ALOHA® dispersion model is the "most commonly used [atmospheric dispersion] model for first responders."

Typically, the CAMEO® system is contained in a portable computer and deployed to the scene of a chemical accident aboard a fire truck or other emergency response vehicle. Once the chemical agent has been identified, CAMEO® provides a vast amount of information on the nature of the threat as well as possible countermeasures. FIG. 2 provides an example of some of the information available to the firefighter.

Once the substance involved in the incident is identified, the ALOHA® air dispersion model can be used to calculate the downwind dispersion under meteorological conditions 1) specified by the firefighter or 2) provided by a portable meteorological station attached to the CAMEO® computer. An example of the output of the air dispersion calculation is shown in FIG. 3.

FIG. 3 shows the plume that would result from the release of 50 pounds per minute of phosphine given a sunny day, with no inversion layer and winds of 10 miles per hour. If a meteorological station is attached to the CAMEO® computer, the plume will be recalculated every 30 seconds to reflect changing atmospheric conditions. The area 16 in the center of the plume represents the concentration determined to "Immediately Dangerous to Life and Health", a concentration (for phosphine) of 50 parts per million. The user has the option of using other health-related threshold concentrations as the basis of the plume calculation. The outer area of the plume 18 (outside the cross-hatched segment) represents a 3-sigma confidence limit on the calculation.

CAMEO®'s mapping module, MARPLOT®, allows the plume diagram to be plotted on a street map and oriented in the downwind direction. The firefighter specifies the origin of the plume by "pointing and clicking" at the appropriate position on the screen. FIG. 4 provides an example of such a plot where the plume as described with respect to FIG. 3 is overlayed on a census map 20.

The three modules, CAMEO®, ALOHA® and MARPLOT®, communicate among themselves as the user moves through the analytical process. That is to say that inputs provided by the user and the results of calculations provided by the program are "remembered" as the user moves among the various modules. This memory can be tapped by queries to the CAMEO® programs or by examining the content of various files temporarily stored on the users hard disk.

Normally, the CAMEO® operator (who must be highly-trained in the proper application and use of the program) will provide verbal summaries via radio of key information gained through use of the program. No means are provided for real-time external access to CAMEO® data. Direct screen transfers are generally problematic due to wireless bandwidth limitations at many remote locations.

It is therefore desirable to have a data transfer agent and system which makes the real-time data from an emergency response database program such as CAMEO®, while in use at an incident, available to other responders and monitoring personnel in a web based environment with low bandwidth transmission requirements.

SUMMARY OF THE INVENTION

Emergency response data coordination and communication is provided by installing a software agent and a wireless communications device on an emergency responder computer terminal having an emergency response data program. The emergency response data program is queried upon activation by an emergency responder using the software agent to determine the state of predefined data elements generated and stored by the emergency response data program. A transmission file of the data elements obtained in the query is created and the transmission file forwarded to a wireless gateway. A centralized computer system connected to the wireless gateway then extracts the data elements and converts geographic data to Geographic Information System formats, converts text information to be displayed directly on screen to HTML format and inserts other text information into database systems to retrieve associated data to be displayed on screen. The resulting display is then forwarded to an Internet-based Geographic Information System, recreating the key elements of the emergency response data program display using predetermined supplemental map data, and the display is posted for web access by permitted users.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Using CAMEO® as an exemplary emergency response database, a system according to the present invention employs an "agent" placed in the CAMEO® computer carried by the emergency responder that queries the various CAMEO® modules on their status (or reads various status files created by the program), a transmitter to transmit the files created by the agent to a remote computer complex, a web distribution node for re-construction of the key displays and distribution via the Internet. Defined in terms of a method, the present invention incorporates the following steps:

1. The "agent", a computer program placed in the emergency responder's computer, interrogates the CAMEO® modules as to current state of knowledge:
   a) What is the date and time of day;
   b) What chemical has the user identified as being involved in the incident;
   c) Is the remote weather station operating and providing data;
   d) What is the wind speed and direction at 3 meters above the surface;
   e) What is the geometry of the projected atmospheric dispersion plume;
   f) What is the "level of concern" identified by the user;
   g) Where has the user placed the origin of the plume.
   Although there are a number of ways to elicit this information from CAMEO®, the method of an exemplary embodiment disclosed herein is to extract two small text files created by CAMEO® as it works through its analytical process—"ALO_ftp.pas" (created by ALOHA® each time the plume dispersion model has been run) and "ALOHA.obj" (created by MARPLOT® each time the plume is plotted on a MARPLOT® map). ALO_ftp.pas contain items a.) through f.) above and ALOGA.obj contains item g.) above.

2. Transmit the data identified in step 1 to a predetermined Internet node at a computer processing facility. This transmission uses in various embodiments a variety of cellular, radio frequency, or satellite transmission methods.

3. When the files are received at the computer facility, they are processed by a computer algorithm that extracts the information required to construct the display:
   a) The geographic description of the plume is converted to one of several Geographic Information System formats, e.g., ESRI shapefile.
   b) Text information to be displayed directly on the final screen is converted to HTML format.
   c) Other text information (e.g. chemical name) is inserted into database systems to retrieve associated data to be displayed on the screen (e.g. response data), if required.

Figure 6:
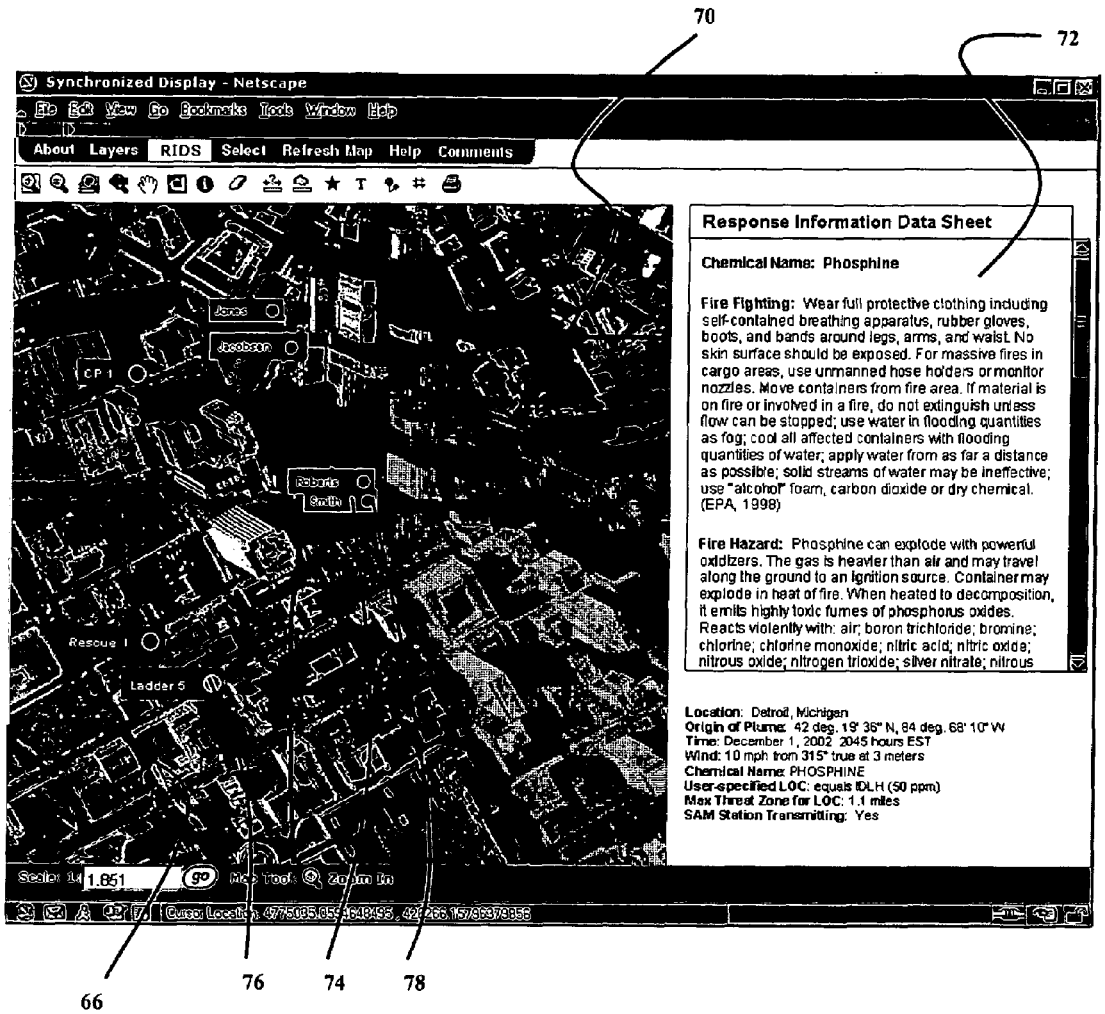
FIG. 6 is a screen shot of an exemplary output from the system.

4. The resulting display is then forwarded to an Internet-based Geographic Information System that will recreate the key elements of the CAMEO® system being viewed on the firefighter's computer (FIG. 6). The base maps used in this process may differ significantly in content from those available in MARPLOT® and provide greater fidelity for use by on-site and monitoring personnel.

It is important to note that although the key data elements remain the same as viewed by the firefighter on the original emergency response program, they are augmented and reorganized in several ways, for example:

a. The base map is no longer restricted to the Census Bureau maps required by MARPLOT® or whatever the mapping program may be for the emergency response system. Any map base may be used, including aerial photographs such as shown provided on the remote terminal display in FIG. 6.

b. Other parameters of interest to the responding community are selectively overlaid on the map display. This capability greatly increases the usefulness of the Internet display of data from an emergency response system such as CAMEO.

5. The Internet display is available to the intended audience via a secure server. As indicated earlier, the user community will include federal, state and local responders involved in the incident, news media, hospitals, command posts, etc. The display also forms the basis for automated telephone information system delivery of information for public awareness.

6. A data cataloging program monitors all incidents hosted through the centralized server to create common incident information for similar chemicals or response scenarios. Multiple incidents occurring substantially simultaneously are cross linked to allow communication regarding potentially interrelated incidents.

Figure 1:
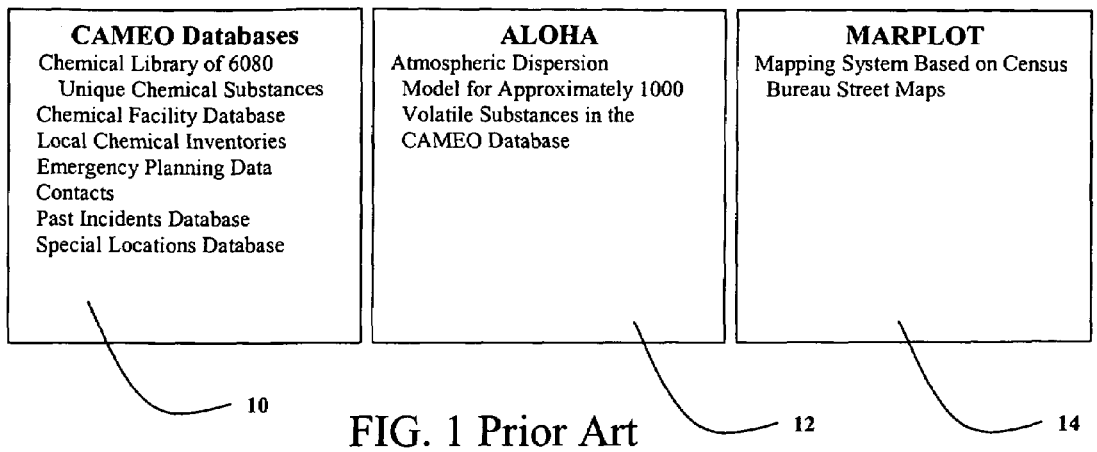
FIG. 1 is a block diagram of the prior art elements of the CAMEO® system.
Figure 2:
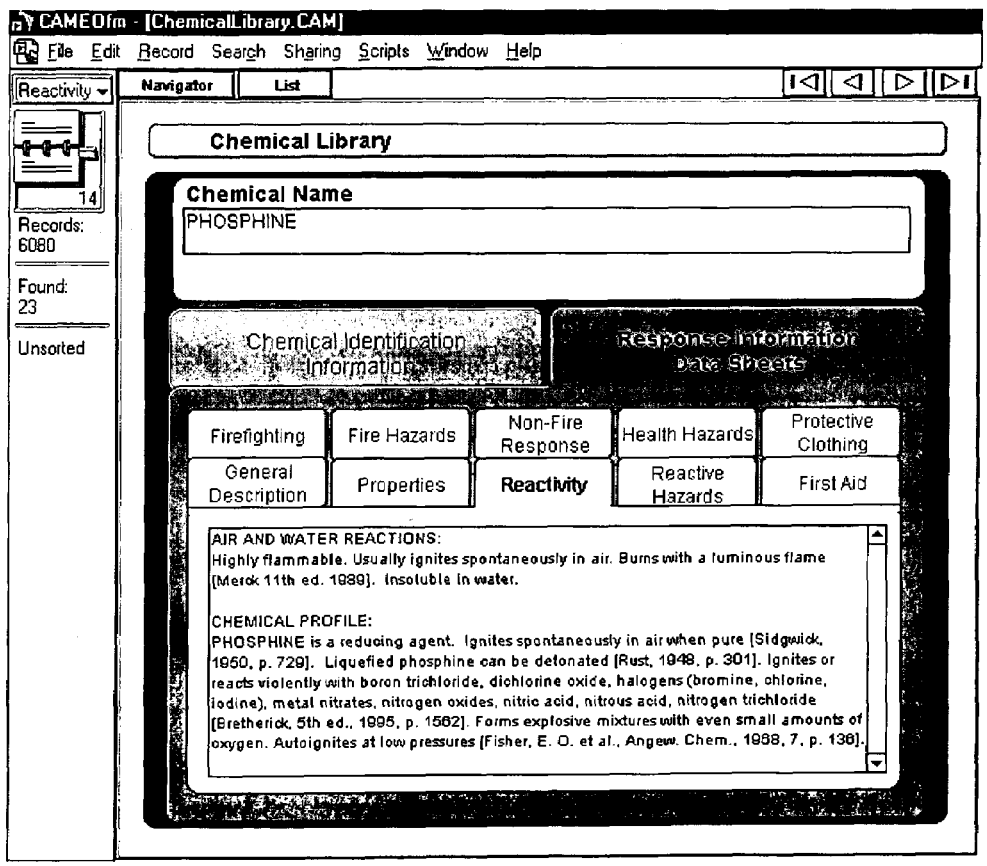
FIG. 2 is a screen shot of a data element display from the CAMEO® database.
Figure 3:
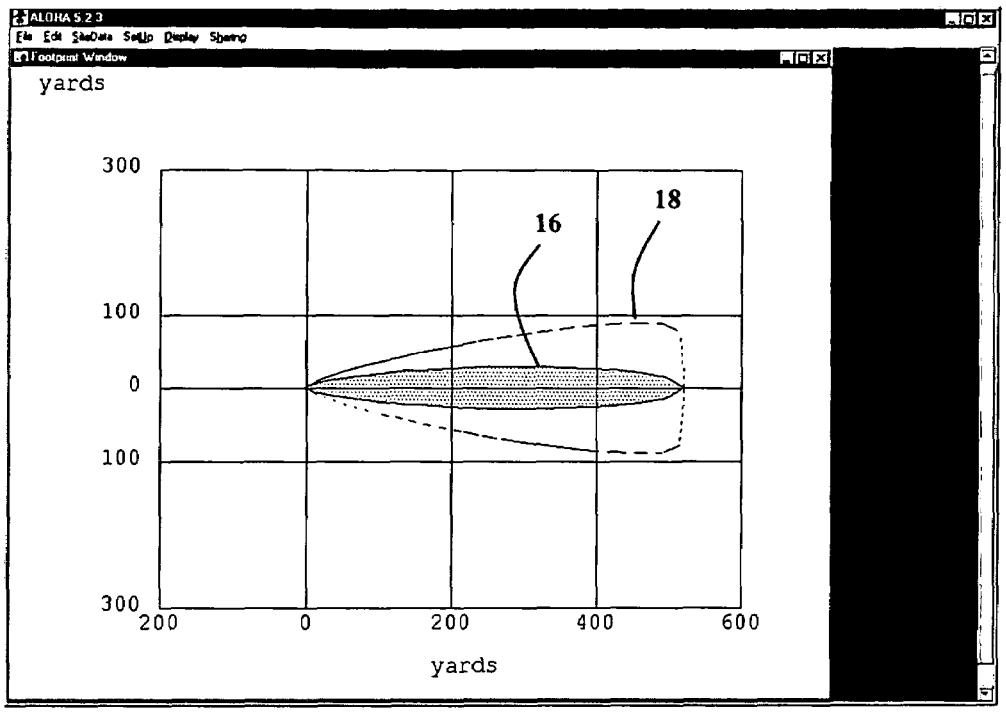
FIG. 3 is a screen shot of a plume calculation by the ALOHA® module of CAMEO®.
Figure 4:
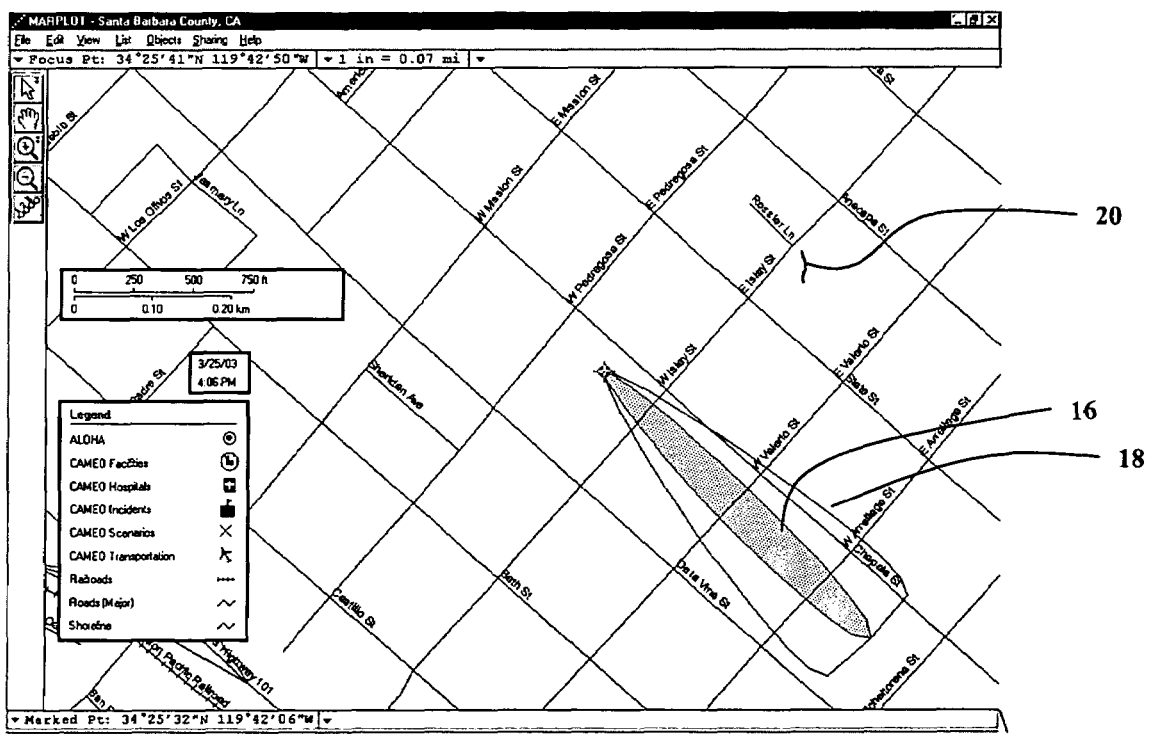
FIG. 4 is a screen shot of the plume calculation of FIG. 3 as output by the MARPLOT® module of CAMEO®.
Figure 5:
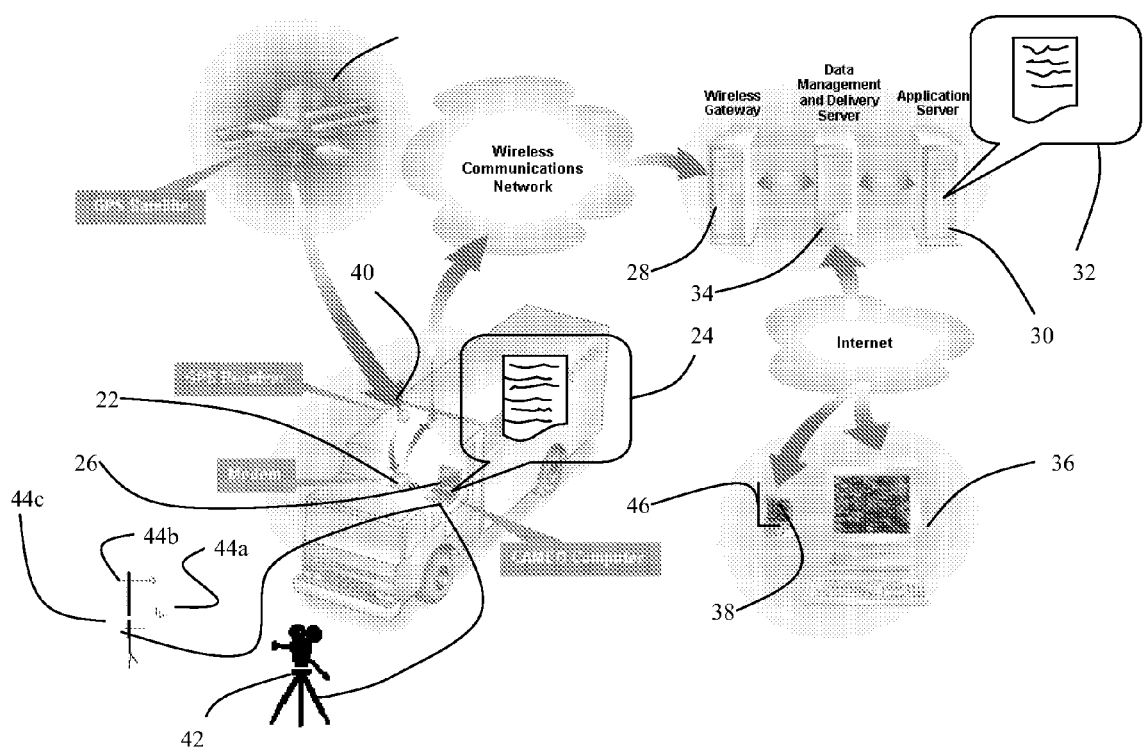
FIG. 5 is a block diagram of an embodiment of the system elements according to the present invention.
Figure 7:
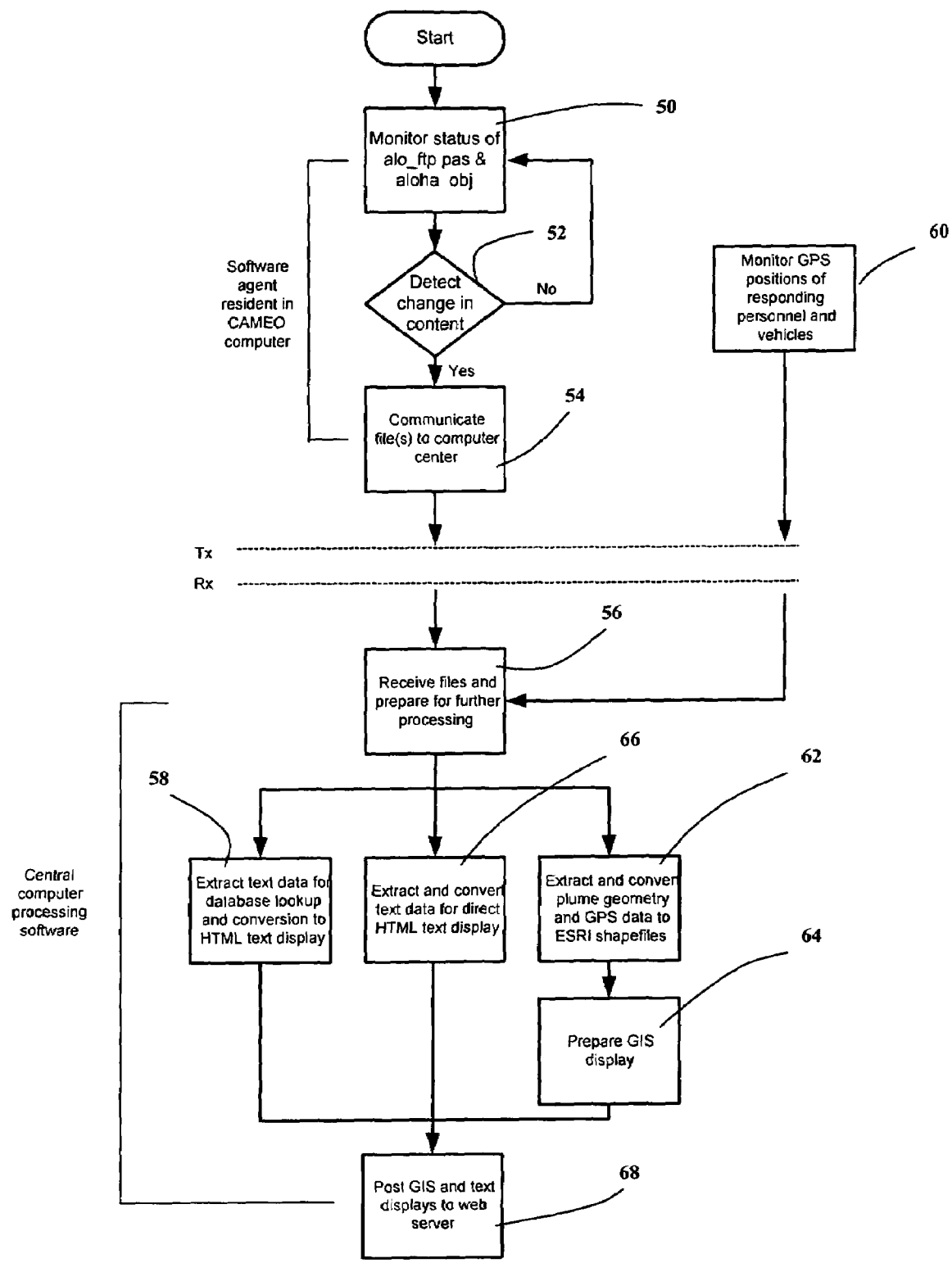
FIG. 7 is a block diagram flowchart of the operations of the software elements of the system.

The system incorporating the invention described in the method above provides, as shown in FIG. 5, a wireless communications module 22 and software package 24 for integration in a CAMEO® equipped computer 26. As shown in FIG. 7, the software package monitors CAMEO®, block 50, on detection of any changes in the either ALO_ftp.pas or ALOHA.obj (indicating a new plume model has originated), block 52, the software element of the agent queries the CAMEO® modules and provides to the communications module a small coded file (consisting of the chemical name, date and time of day, origin of the incident, geometry of the plume, wind speed and direction from the on-scene CAMEO® computer, block 54. The communications module transmits the file through a wireless gateway 28, in FIG. 5, to a GIS applications server 30 located in a centralized processing center.

A control software set 32 in the GIS applications server receives the files and prepares for further processing, block 56 of FIG. 7, creates real-time, synchronized displays of CAMEO® data by extracting text data for database lookup and conversion to HTML text display, block 58, and maps are recreated by extracting and converting the plume geometry with added information from received GPS data, block 60, into GIS compatible shapefiles, block 62. A GIS display is then prepared, block 64. Additional text data for direct HTML text display is extracted, block 66. The control software posts the data and maps, block 68, to a web server 34 shown in FIG. 5 to make the data and maps available via standard Internet browser technology to remote terminals 36 monitored by emergency operations center personnel, police and health authorities and other authorized users who are remote from the incident. Small, hand held devices 38 provide key data and maps for responders in the immediate vicinity of the incident, but without direct access to the CAMEO® computer. Displays on the remote terminals and hand held devices are shown in exemplary form in FIG. 6. The CAMEO® information and supplemental information provided to the web site by the GIS applications server is integrated in a single display. The plume information 70 is overlayed on a map 66 selected by the user and not limited to the CAMEO® system's capability. In the embodiment shown, an aerial photograph is employed. CAMEO® data 72 recreated at the central server is displayed as well as supplemental HTML text information 74 such as responder identification. In FIG. 6, GPS locations of responding vehicles 76 and individuals 78 are included.

The system provides the infrastructure upon which other key operational parameters not currently part of the CAMEO® system are overlaid to greatly increase their overall information value. These include GPS coordinates of responding vehicles and personnel provided by a GPS receiver 40 as shown in FIG. 5, on-scene video from deployed camera(s) 42 and output from a remote weather station incorporating various chemical sensors 44a, anemometer 44b and thermometer 44c deployed during the incident. Individual responders carrying GPS locating systems 46 integral with their remote handhelds or associated with other equipment are also monitored by the system to add location information on these responders to the presentation.

Since CAMEO® is broadly distributed in the United States, the system provides a nucleus for real-time monitoring of many simultaneous responses broadly distributed throughout the country and, as such, may form the basis for a national monitoring system for hazardous chemical responses. Further, the centralized server provides a basis for monitoring all emergency response occurrences for cataloging purposes and for monitoring commonality of emergencies under response. This ability allows use of the system in a terrorist response scenario where multiple occurrences of chemical or biological attack may be occurring substantially simultaneously.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. An emergency response data coordination and communication system comprising:
    a software agent inserted in an emergency responder computer terminal having an emergency response data program, the software agent having means to query the emergency response data program to determine the state of predefined data elements generated and stored by the emergency response data program and means for creating a transmission file of the data elements;
    a wireless transmitter inserted in the computer terminal adapted to receive and transmit the transmission file;
    a wireless gateway receiving the transmitted file;
    a GIS application server operably connected to the wireless gateway and having means to extract the data elements, means to convert geographic data to a Geographic Information System format, the geographic data including plume geometry, means to convert a first set of text information to be displayed directly on the final screen to HTML format, means for inserting a second set of text information into database systems to retrieve associated data to be displayed on the screen and means for creating the resulting display; and
    an automated weather station having means for wind speed and direction sensing connected to the computer terminal, said transmitter also transmitting wind speed and direction, said GIS application server including means for adjusting plume geometry dependent on said wind speed and direction.

2. An emergency response data coordination and communication system as defined in claim 1 further comprising:
    a GPS receiver attached to the computer terminal, said transmitter also transmitting position information from the GPS receiver.

3. An emergency response data coordination and communication system as defined in claim 2 wherein the geographic data includes data from the GPS receiver.

* * * * *